(No Model.)
C. F., A. W. & A. L. LAWTON.
Process of Manufacturing and Purifying Gas for Preserving Purposes.
No. 242,546. Patented June 7, 1881.
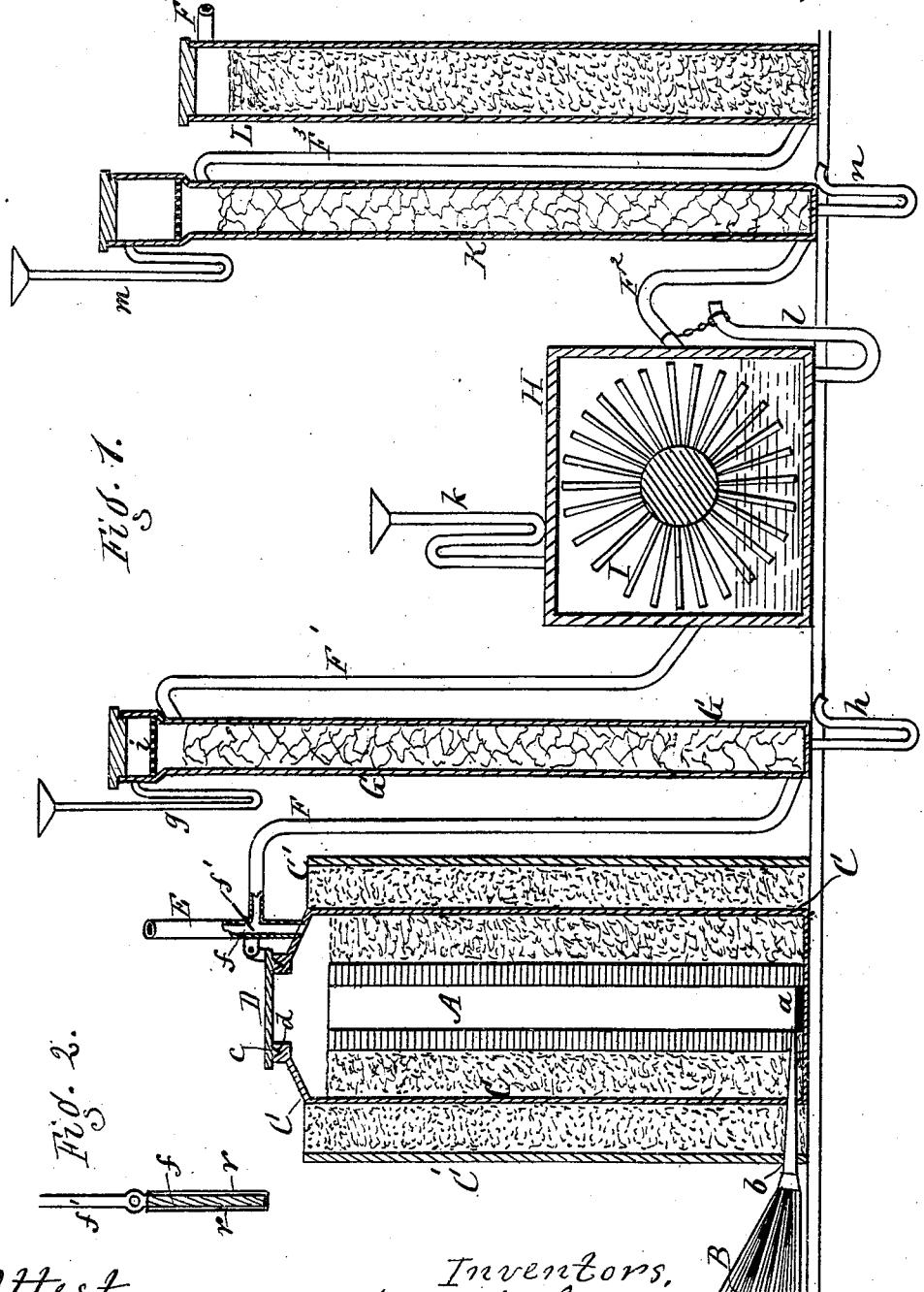

UNITED STATES PATENT OFFICE.

CHARLES F. LAWTON, ARTHUR W. LAWTON, AND ALBERT L. LAWTON, OF ROCHESTER, NEW YORK.

PROCESS OF MANUFACTURING AND PURIFYING GAS FOR PRESERVING PURPOSES.

SPECIFICATION forming part of Letters Patent No. 242,546, dated June 7, 1881.

Application filed December 6, 1880. (No model.)

*To all whom it may concern:*

Be it known that we, CHARLES F. LAWTON, ARTHUR W. LAWTON, and ALBERT L. LAWTON, all of Rochester, Monroe county, New York, have invented an Improved Process of Manufacturing and Purifying Gas for Preserving Purposes; and we do hereby declare that the following is a full, clear, and exact description of the same, reference being had to the accompanying drawings, in which—

Figure 1 is a vertical longitudinal section of the apparatus, and Fig. 2 is a section of the valve $f$ enlarged.

Our improvement relates to the cheap and rapid production and purification of carbonic-oxide gas mixed with nitrogen gas for preserving purposes, and the apparatus is constructed as follows:

A represents a retort or furnace of considerable height and comparatively small diameter. It is built of or lined with fire-brick, fire-clay, or other suitable material. The top is open, and at the bottom is a small opening, $a$, for the withdrawal of ashes, the same being covered by a tight door.

B is a bellows, having a long nozzle, $b$, entering at the bottom of the retort, by which air can be forced in.

C C' are two cylinders forming jackets which surround the retort, being located one outside the other and at some distance apart, as shown. The inner cylinder is of iron and the outer one of wood. The annular spaces between the retort and cylinders are packed with dry calcined gypsum, burnt alum, iron wool, dry lime, dry ashes, magnesia, asbestus, or other materials which serve as non-conductors of heat. The top of the inner casing is arched over the retort, and has at its top an opening, over which rests a hinged cover, D. The cover has a sharp-edged flange, $c$, which shuts down into a corresponding V-shaped groove, $d$, in the top of the casing. This groove is filled with a luting of pasty material, into which the flange of the cover strikes to make an air-tight packing. The inner casing, C, has a closed bottom, and it forms practically a gas-tight casing inclosing the retort.

E is a waste-pipe, which opens from the casing C in the space over the retort, and F is a gas-pipe, by which the gas escapes from the retort and is conveyed to the purifying apparatus. At the junction between the waste and gas pipes is a valve, $f$, which is capable of being shifted so as to cover one pipe and open the other, and vice versa. The surface of this valve is covered with asbestus paper $r$, which serves as a non-destructible packing to close the pipes gas-tight. The valve has a lever, $f'$, resting outside the pipes, by which it is readily operated.

G is a high cylinder of comparatively small diameter, closed at the bottom and having a removable cover at the top. The gas-pipe F opens into the lower end of this cylinder. A bent water-pipe, $g$, of siphon form, forming a trap, and having a funnel-head, enters the top of the cylinder. A similar bent pipe, $h$, forming a trap, opens from the bottom of the cylinder. A grating or strainer, $i$, rests in the top of the cylinder, through which the water is strained, for the purpose of causing a slow and even distribution of the water over the contents of the cylinder.

F' is a gas-pipe extending from the top of the cylinder G and opening into the side of a receptacle, H. In this receptacle is a revolving brush, I, consisting of a shaft with projecting spines of wood, metal, or other material, which enter the liquid in the bottom of the receptacle and raise it by contact with the brush, so that the gas will pass through the same. On top of the receptacle is a double-bent filling-pipe, $k$, forming a trap, and at the bottom is a flexible or a jointed pipe, $l$, which can be raised and lowered at pleasure for the discharge of the liquid contents of the receptacle.

$F^2$ is a gas-pipe leading from receptacle H, and K is a cylinder similar to G, with the bottom of which the gas-pipe connects. This cylinder has bent induction and eduction pipes $m$ $n$, similar to those of the other cylinder.

$F^3$ is a gas-pipe extending from cylinder K and opening into the bottom of cylinder L. This cylinder has simply a discharge-pipe, $F^4$, at its top, which conveys the purified gas to a gasometer or other storing-receptacle. The several receptacles G, H, K, and L are purifiers.

The operation is as follows: Fire is kindled at the bottom of the retort, and it is then filled to the top with hard coal, charcoal, or coke. Air is blown in at the bottom by means of the bellows. While the retort is in process of becoming heated a large quantity of air is forced in to support combustion and produce great heat, at which time no gas but carbonic acid or dioxide is produced, and this gas is allowed to escape through the waste-pipe E or through the opening above the furnace. When the bottom of the furnace becomes red hot the cover D is closed and the waste-pipe E is also closed, and gas is allowed to flow through the gas-pipe F. At the same time less air is blown in from the bellows. Enough is admitted to support combustion in the bottom of the retort only, and to produce such pressure in the retort as will drive the carbonic-acid gas upward through the retort; but the body of coal standing high in the retort and above the combustion remains red hot. The carbonic-acid gas rising through the fuel is decomposed by the red-hot carbon taking half of the oxygen, and is thereby converted into carbonic-oxide gas. At the same time nitrogen gas supplied by the air which is blown in by the bellows is supplied and is mixed with the oxide, producing mixed carbonic-oxide and nitrogen gases.

As the process of producing the gases is a cooling one, the tendency is to produce chilling of the retort, in which case no production will take place; and to obviate this the two layers of non-heat-conducting medium are used outside the retort, embedding the same so deeply that it retains nearly all the heat generated. At the same time the inner casing extends high enough above the retort to form a dome, and has the self-packing door or cover, by which the retort is filled. The inside casing serves as a gas-tight inclosure to the retort, by which all the gas that is produced is retained, and air is prevented from entering, except as it is blown in from the bellows.

The purifier G is filled with some coarse broken hard material, presenting open interstices that will allow water a free passage downward and the gas a free passage upward through the same. The material known as "Pittsburg coke" has been found best for this purpose. The water enters through the bent trap-pipe at the top, trickles through the whole mass of material in the case, wetting the same, and finally escapes through the bent pipe in the bottom, while the gas passes counter to it, and by coming in contact with the water in large surface it is thoroughly washed. The object is more particularly to remove carbonic acid and other impurities from the gas.

The receptacle H is partially filled with a liquid composition consisting of caustic lime, ferric protosulphate, and sulphite or bisulphite of lime or soda mixed with water. The brush constantly brings the liquid up and exposes it in a large surface to the gas flowing through it. The flexible or jointed pipe $l$, in addition to serving as a discharge-pipe, may be used to gage the height of the liquid in the receptacle by raising its outer end more or less, thus securing the desired height in the receptacle. The caustic lime in this composition removes from this gas any carbonic acid which comes over from the first purifier; also removes any sulphureted or phosphoreted hydrogen in the gas. It also decomposes the ferric protosulphate and reduces it to protoxide of iron. The ferric monoxide or protoxide of iron resulting from the decomposition fixes or removes any free or loosely-combined oxygen. The sulphites or bisulphites of lime or soda have a similar effect in removing oxygen.

The third purifier, K, is also filled with Pittsburg coke or equivalent material, and strong sulphuric acid is passed down through it, while the gas ascends, as in the first purifier. The object of this purifier is to remove any ammonia or weak ammonia compounds that remain in the gas after having passed the previous purifiers, and also to remove from the gas all excess of moisture that has been carried along from the other purifiers.

The fourth purifier, L, is filled with a mixture of dry calcined asbestus and magnesia or magnesia and bone-black. The gas entering the bottom of the purifier flows in a steady current upward through the packing to the top of the purifier, where it escapes through pipe $F^4$ to the storing-tank. The magnesia or magnesia and bone-black neutralizes whatever of acid properties are carried over with the gas from the acid purifier. The asbestus is a powerful absorbent of odors and impurities, and it presents a great amount of surface in small bulk. The packing in this last purifier forms a filter, and when the gas finally escapes it is in a very pure state.

The crooked inlet and exit pipes in the first three purifiers allow the liquids to be entered and removed in a continuous manner and without escape of gas, each pipe forming a trap.

In the first purifier the water is kept running in a steady stream downward and outward.

The pure mixed carbonic oxide and nitrogen gases thus produced are used for preserving organic substances in the manner described in another application for patent, which we have filed contemporaneously with this one.

Having thus described our invention, what we claim, and desire to secure by Letters Patent, is—

1. The method herein described of generating and purifying mixed carbonic oxide and nitrogen gases, which consists in first subjecting hard coal, coke, or charcoal to fire in a closed retort and blowing air therein from a bellows, then passing the generated gases through a purifier packed with coarse material, through which passes water in fine streams for the purpose of washing the gases, then passing them through a second purifier having a solution of caustic lime, ferric protosulphate, sulphite or bisulphite of lime or soda, for the purpose of removing any carbonic acid, sulphureted and phosphoreted hydrogen, and any free or loosely-combined oxygen from the gases, then passing them through a third purifier filled with coarse material, through which passes sulphuric acid, for the purpose of removing ammonia and weak ammonia compounds, and finally passing them through a fourth purifier filled with dry calcined asbestus and magnesia or magnesia and bone-black, for the purpose of neutralizing acid vapors, absorbing odors, and for filtering the gases, as herein described.

2. As a step in the purification of mixed carbonic oxide and nitrogen gases, the process of subjecting the gases in their passage to a solution of caustic lime, ferric protosulphate, and sulphite or bisulphite of lime or soda, for the purpose of removing carbonic acid, sulphureted or phosphoreted hydrogen, and oxygen, as herein described.

3. As a step in the purification of mixed carbonic-oxide and nitrogen gases, the process of subjecting the gases in their passage to a compound of dry calcined asbestus and magnesia or magnesia and bone-black, for the purpose of neutralizing acid vapors, absorbing odors, and filtering the gases, as herein described.

In witness whereof we have hereunto signed our names in the presence of two subscribing witnesses.

CHAS. F. LAWTON.
ARTHUR W. LAWTON.
ALBERT L. LAWTON.

Witnesses:
  FRANK J. EIGHME,
  R. F. OSGOOD.